(12) United States Patent
Shimizu

(10) Patent No.: US 7,242,643 B2
(45) Date of Patent: Jul. 10, 2007

(54) OPTICAL DISK APPARATUS

(75) Inventor: Akitaka Shimizu, Osaka (JP)

(73) Assignee: Funai Electric Co., Ltd., Osaka (JP)

(*) Notice: Subject to any disclaimer, the term of this patent is extended or adjusted under 35 U.S.C. 154(b) by 573 days.

(21) Appl. No.: 10/801,549

(22) Filed: Mar. 17, 2004

(65) Prior Publication Data
US 2004/0184363 A1 Sep. 23, 2004

(30) Foreign Application Priority Data
Mar. 18, 2003 (JP) ............ P 2003-073426

(51) Int. Cl.
G11B 7/11 (2006.01)
(52) U.S. Cl. .................. 369/30.36; 369/53.19; 369/53.14
(58) Field of Classification Search .......... None
See application file for complete search history.

(56) References Cited
U.S. PATENT DOCUMENTS
6,041,030 A * 3/2000 Ohmi ............ 369/53.19
6,842,414 B1 * 1/2005 Park ............ 369/53.19

FOREIGN PATENT DOCUMENTS
JP 06187712 * 7/1994
JP A-6-187712 7/1994

* cited by examiner

Primary Examiner—Andrea Wellington
Assistant Examiner—Jorge Leonardo Ortiz-Criado
(74) Attorney, Agent, or Firm—Morgan, Lewis & Bockius LLP

(57) ABSTRACT

In an optical disk apparatus, after chucking an optical disk, the optical disk apparatus defers the start of the rotation of the optical disk, and measures the focusing drive voltage at two points, i.e., a point near a center of the optical disk and a point near an outer edge of the optical disk. Then, based on the measured values, the optical disk apparatus determine the angle at which the optical disk is slanted. Therefore, when the optical disk has been chucked inappropriately, the chucking state can be determined without rotating the optical disk, and scratching of the optical disk and damage to the optical disk apparatus can be prevented.

10 Claims, 4 Drawing Sheets

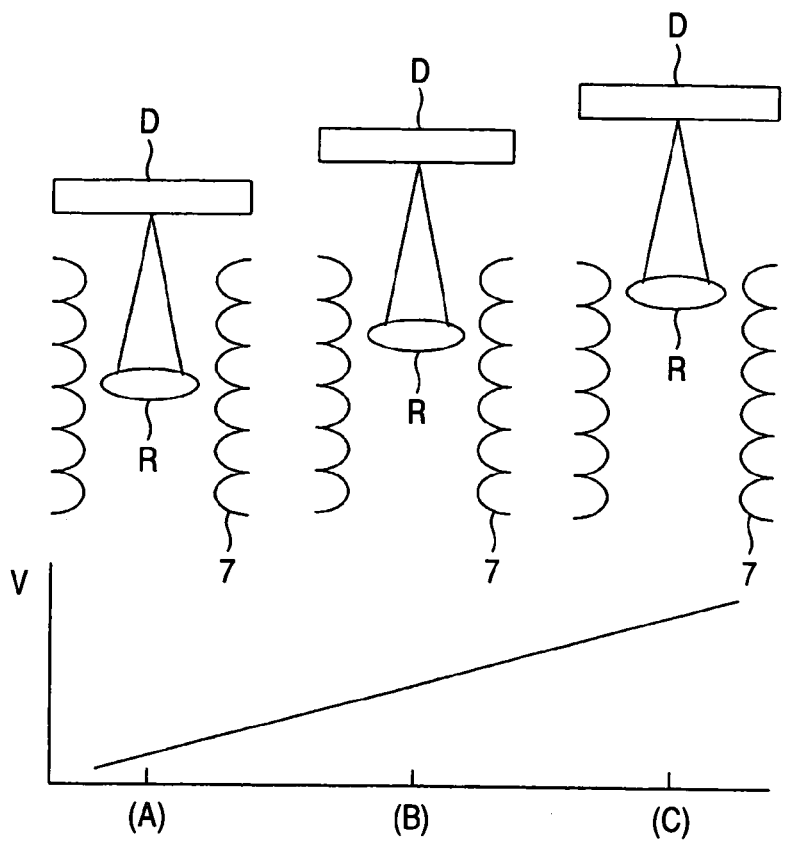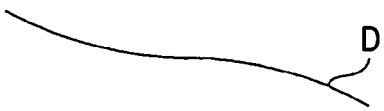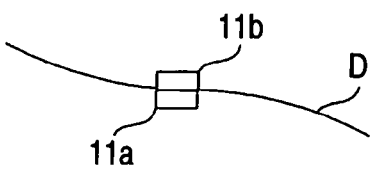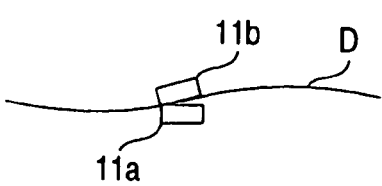

OPTICAL DISK APPARATUS

BACKGROUND OF THE INVENTION

1. Field of the Invention

The present invention relates to an optical disk apparatus that uses an optical pickup to determine whether the chucking of an optical disk is appropriate.

2. Description of the Related Art

An optical disk apparatus includes a turntable rotated by a spindle motor. For an optical disk apparatus having a tray, when an optical disk is placed on the tray, the optical disk is carried into the apparatus and is clamped on the turntable. Then, while the turntable is being rotated rapidly by the spindle motor of the optical disk apparatus, an optical pickup records data, or reproduces data previously recorded, on the optical disk by emitting a laser beam that is focused on the optical disk.

Sometimes, the chucking of the optical disk by the optical disk apparatus is faulty, and the optical disk is chucked in a slanted state. In this case, the optical disk apparatus may not appropriately record or reproduce data on the optical disk. Further, when the chucking performed by the optical disk apparatus is faulty, and an optical disk in a slanted state is rotated rapidly, the optical disk may abut against the disk tray or other internal device portions, and may be scratched or may damage the optical disk apparatus.

Therefore, a conventional device for chucking an optical disk mounted on a turntable notifies a user that a chucking error has occurred, before the turntable is rotated, when it is determined that the optical disk has been incorrectly chucked (e.g., see JP-A-6-187712 (pages 3 to 8, FIGS. 1 to 7)).

To determine a chucking state, the device disclosed in JP-A-6-187712 for chucking an optical disk mounted on a turntable activates a focusing servo for an optical pickup at an initial position facing a lead-in area near the center of the optical disk. As a result, an incorrect chucking state determination may be made.

Specifically, since an optical disk is chucked at its center hole, when the optical disk is held in a slanted state, the distance from the optical pickup is changed more at the outer edge of the optical disk. FIGS. 5A and 5B are diagrams showing the positional relationship between an optical pickup and the recording face of an optical disk that has been inappropriately chucked by an optical disk apparatus. When the optical disk apparatus chucks the optical disk at a predetermined slant angle, as is shown in FIG. 5A, the distance from the optical pickup is not much changed when the optical disk is rotated at the position facing the lead-in area, so that the optical disk apparatus can activate the focusing servo with no problem. On the other hand, as is shown in FIG. 5B, the distance from the optical pickup changes greatly when the optical disk is rotated and the optical pickup is positioned facing the outer edge of the optical disk, so that the optical disk apparatus cannot activate the focusing servo. However, since to determine the chucking state the chucking device disclosed in JP-A-6-187712 actuates the focusing servo at the position facing the lead-in area, even in the case shown in FIG. 5B, the chucking device will determine that the chucking is appropriate.

SUMMARY OF THE INVENTION

To resolve this shortcoming, it is one objective of the present invention to provide an optical disk apparatus that can accurately determine whether an optical disk has been appropriately chucked.

This invention includes the following configuration as means for resolving the shortcoming.

(1) An optical disk apparatus including: a tray means for carrying an optical disk in and out of the optical disk apparatus; a chucking means for chucking the optical disk; a laser irradiation means for emitting a laser beam that is focused on the optical disk, and for activating a focusing servo; a moving means for moving the laser irradiation means in a radial direction of the optical disk; a measurement means for, after the chucking means has chucked the optical disk, measuring focusing drive voltages for the focusing servo at a point near a center of the optical disk and at a point near an outer edge of the optical disk, without rotating the optical disk; and a control means for comparing, with a first reference value, a difference between the focusing drive voltages measured by the measurement means, and for, when the difference between the focusing drive voltages is greater than the first reference value, permitting the chucking means to release and again chuck the optical disk.

With this configuration, after an optical disk has been chucked and while the start of the rotation of the optical disk is deferred, the focusing drive voltage is measured at two points, i.e., a point near the center of the optical disk and a point near the outer edge of the optical disk, and based on the measured values, the angle at which the optical disk is slanted can be determined. Therefore, when an optical disk has been chucked inappropriately, the chucking state can be determined without rotating the optical disk, and scratching of the optical disk and damage to the optical disk apparatus can be prevented. Further, when the angle at which an inappropriately chucked optical disk is slanted is greater than the first reference value, the optical disk apparatus can repeat the chucking process and correct a chucking error.

(2) In the case where the chucking means repeats the chucking of the optical disk, the measurement means, without rotating the optical disk, again measures the focusing drive voltages for the focusing servo at the point near the center of the optical disk and the point near the outer edge of the optical disk, and the control means compares, with the first reference value, the difference between the focusing drive voltages, and when the difference is greater than the first reference value, permits the chucking means to release the optical disk and the tray means to discharge the optical disk.

With this configuration of the optical disk apparatus, when the state of an optical disk that is again chucked is determined to be inappropriate, the optical disk is discharged. Therefore, the user can immediately apprehend that the optical disk was chucked incorrectly and examine the optical disk.

(3) In the case where the measurement means measures the focusing drive voltages while the laser irradiation means is moved between the point near the center of the optical disk and the point near the outer edge and the focusing servo is actuated, the control means compares, with a second reference value, a difference between the focusing drive voltages for the measurements made by the measurement means at the two adjacent points, and when the difference between the focusing drive voltages is greater than the second reference value, permits the chucking means to release the optical disk and the tray means to discharge the optical disk.

With this configuration, an optical disk can be examined for warping and a user can be informed when it is determined that the optical disk is badly warped. Further, erroneous use, by the user, of the warped optical disk can be avoided.

(4) The measurement means measures focusing drive voltages while the moving means moves the laser irradiation means from the outer edge to the center.

Since the optical disk apparatus performs the recording and reproduction of data beginning at the center of the optical disk, the recording and reproduction of data on the optical disk can be performed immediately after the focusing drive voltage measurements have been completed, and the chucking and the warping of the optical disk have been determined to be satisfactory.

BRIEF DESCRIPTION OF THE DRAWINGS

FIGS. 2A to 2C are diagrams showing the relationship between the position of an object lens of the optical pickup and a focusing drive voltage;

FIGS. 3A to 3C are front views of an optical disk D having a distorted face, and the state wherein this optical disk D has been chucked by the optical disk apparatus;

DETAILED DESCRIPTION OF THE PREFERRED EMBODIMENTS

Figure 1:
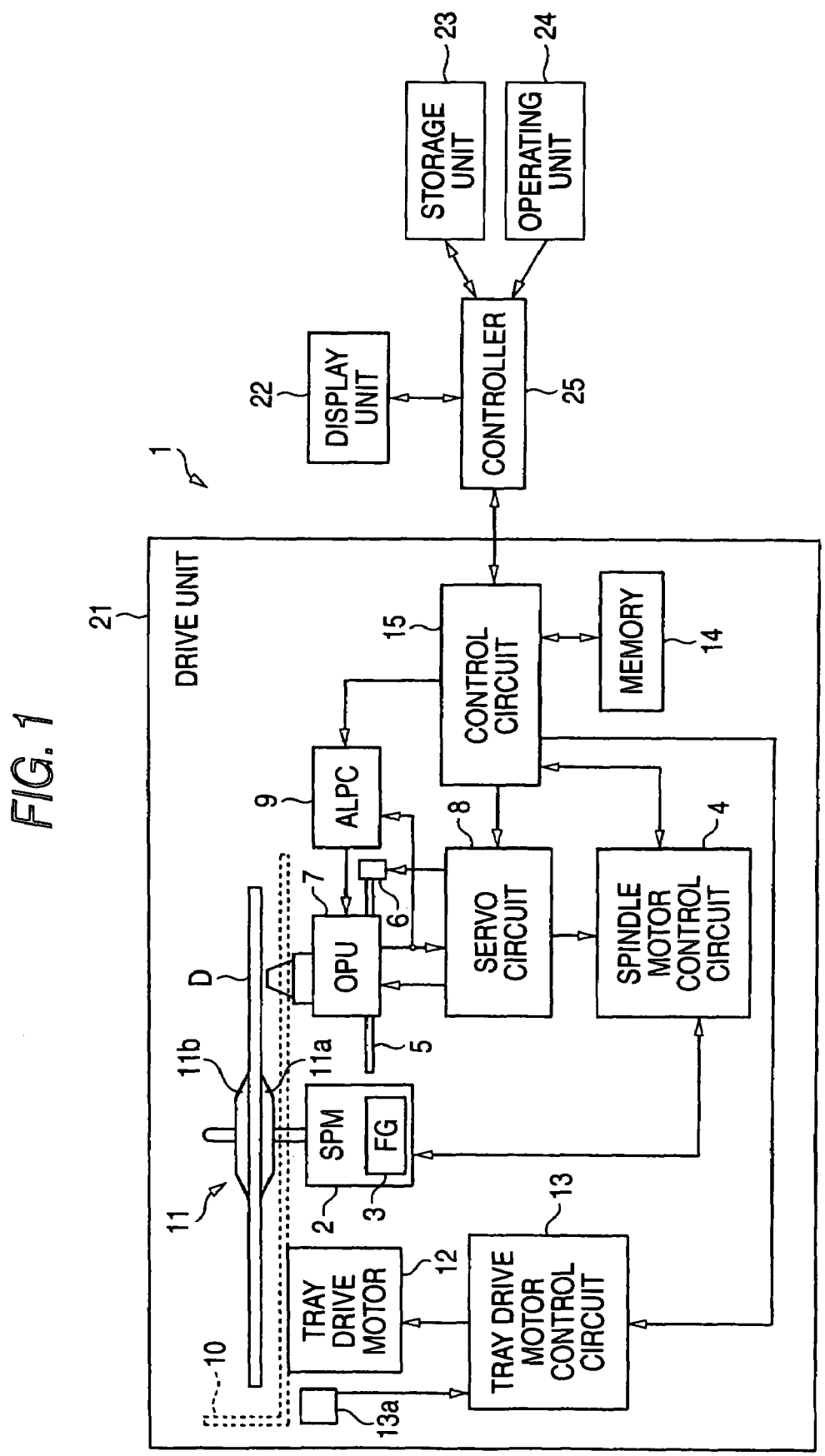
FIG. 1 is a schematic diagram showing the configuration of an optical disk apparatus according to one embodiment of the present invention.

FIG. 1 is a schematic diagram showing the configuration of an optical disk apparatus according to one embodiment of the present invention. An optical disk apparatus 1 includes: a drive unit 21, a display unit 22, a storage unit 23, an operating unit 24 and a controller 25. The drive unit 21 reproduces data read from an optical disk; the display unit 22 displays the contents to be transmitted to a user; the storage unit 23 stores programs for the operation of the controller 25; the operating unit 24 is a device that enables a user to transmit various operating instructions to the optical disk apparatus 1; and the controller 25 controls the individual sections of the optical disk apparatus 1.

The drive unit 21 includes a spindle motor 2, a frequency generator (FG) 3, a spindle motor control circuit 4, a guide rail 5, a feed motor 6, an optical pickup (OPU) 7, a servo circuit 8, a laser power control circuit (ALPC) 9, a tray 10, a chucking mechanism 11, a tray drive motor 12, a tray drive motor control circuit 13, a memory 14 and a control circuit 15.

The spindle motor 2 rotates an optical disk D. A turntable 11a, which is part of the chucking mechanism 11 for holding (chucking) the optical disk D, is provided near the distal end of the rotary shaft of the spindle motor 2. The optical disk D is mounted on the turntable 11a by a clamper 11b.

The frequency generator 3 outputs signals to the spindle motor control circuit 4 for detecting the position (angle) of the rotary shaft of the spindle motor 2 and the revolutions of the spindle motor 2. During one rotation at a constant speed of the spindle motor 2, the frequency generator 3 outputs a constant number of pulse signals at the same intervals. The spindle motor control circuit 4 detects this pulse signal to obtain the position (angle) and the revolutions of the optical disk D attached to the rotary shaft of the spindle motor 2.

The spindle motor control circuit 4 rotates the spindle motor 2 based on the pulse signals received from the frequency generator 3.

The guide rail 5 is used to support the optical pickup 7, enabling the movement of the optical pickup 7, which faces the optical disk D, in the radial direction relative to the optical disk D.

The feed motor 6 is a motor for supplying a driving force for moving the optical pickup 7 in the radial direction relative to the optical disk D.

The optical pickup 7 includes a laser diode, an optical system such as a lens and a mirror, a reflected light receiving device, a focusing servo mechanism and a tracking servo-mechanism (none of them shown). For the recording and reproduction of data, the optical pickup 7 uses the laser diode to emit a laser beam that is focused on the optical disk D, receives light reflected by the optical disk D, and consonant with the received light signal, outputs a tracking error signal or a focusing error signal to the servo circuit 8. The focusing servo mechanism is used to maintain a constant distance between the lens of the optical pickup 7 and the recording face of the optical disk D, and the tracking servo mechanism is used to constantly emit a laser beam that is focused on a pre-groove (recording track) formed in the recording layer and the label face of the optical disk D. Furthermore, the optical pickup 7 includes a photodiode for a laser power monitor. The photodiode receives part of the laser beam emitted by the laser diode, and outputs to the laser power control circuit 9 a current consonant with the power of the received laser beam.

In order to position the optical pickup 7 appropriately, the servo circuit 8 performs the focusing and tracking for the optical pickup 7, and permits the feed motor 6 to feed the optical pickup 7. In addition, when the optical pickup 7 initiates the focusing servo, the servo circuit 8 outputs the value of the focusing drive voltage to the control circuit 15.

The laser power control circuit 9 controls the power of a laser beam emitted by the laser diode of the optical pickup 7. Specifically, based on the value of a current received from the photodiode of the optical pickup 7 and data, received from the control circuit 15, designating an optical laser power target value, the laser power control circuit 9 permits the laser diode of the optical pickup 7 to emit a laser beam having the designated power.

The tray 10 is used to carry the optical disk D into and out of the optical disk apparatus 1.

The chucking mechanism 11 holds the optical disk D in order to stably rotate the optical disk D at a high speed, and uses the turntable 11 and the clamper 11b to sandwich the optical disk D. The chucking mechanism 11 interacts with the movement of the tray 10, i.e., when the tray 10 with the optical disk D being placed is retracted into the optical disk apparatus 1, the chucking mechanism 11 chucks the optical disk D. Therefore, until the tray 10 is moved out to a predetermined position, the chucking mechanism 11 cannot release the optical disk D.

Instead of this structure, another structure may be employed for the chucking mechanism 11. A plurality of optical disk holding pawls may be provided for the turntable 11a to hold the optical disk. Further, the chucking mechanism 11 may cancel the chucking of the optical disk D before the tray 10 is carried out to the predetermined position.

The tray drive motor 12 supplies a driving force for moving the tray 10 out of and into the drive unit 21.

The tray drive motor control circuit 13 rotates the tray drive motor 12 based on a signal received from the control circuit 15. An eject button 13a, connected to the tray drive motor control circuit 13, is used to enter an instruction for the movement, out or in, of the tray 10.

The memory 14 is used to store a reference value and a measurement value for a focusing drive voltage.

The control circuit 15, which includes a CPU, a ROM and a RAM, transmits control signals, in accordance with a program stored in the ROM, to the spindle motor control circuit 4, the servo circuit 8 and the laser power control circuit 9 of the optical disk apparatus 1, and controls the individual sections connected to these circuits.

The functions of the optical disk apparatus 1 will now be explained.

(1) Chucking Determination

When the chucking of an optical disk D is completed, the optical disk apparatus 1 activates the focusing servo, without rotating the optical disk D, at two different points in the radial direction relative to the optical disk D, and determines the chucking state. FIGS. 2A, 2B and 2C are diagrams showing the relationship between the position of an object lens R of the optical pickup 7 and the focusing drive voltage. As is well known, when the optical pickup 7 activates the focus servo, the focusing drive voltage, which is the drive voltage supplied for the focus actuator of the optical pickup 7, becomes a value proportional to the distance between the object lens R of the optical pickup 7 and the optical disk D. That is, as is shown in FIGS. 2A to 2C, during the focus servo process, as the optical disk D is moved away from the optical pickup 7, the focusing drive voltage must be increased in order to bring the object lens R of the optical pickup 7 nearer the optical disk D.

According to this embodiment, a chucking process is performed to position a flat optical disk D, which is positioned correctly when it is not slanted, in the optical disk apparatus 1, and once the chucking process has been performed, focusing drive voltages are obtained and measured, and stored in the memory 14. Further, a permissible value for a voltage difference corresponding to the slant angle of the optical disk D is also stored in the memory 14. The focusing drive voltages are measured at two different points in the radial direction of the optical disk D, and a difference between the two voltage values (focusing drive voltage values) obtained by the measurements is calculated and compared with the permissible value (reference value) stored in the memory 14. When the difference between the measured voltages is smaller than the permissible value, it is determined that the chucking state is satisfactory.

Of the two different points in the radial direction of the optical disk D that are used when measuring the focusing drive voltages, one point should be near the outer edge of the optical disk D. For a CD-R or a DVD-R, an area near the edge, outside the program area, is preferable. The other point should in an area located near the center hole in the optical disk D. For a CD-R or a DVD-R, the area near the lead-in area, or one nearer the center than the lead-in area, is preferable.

As is described above, an optical disk D is supported at its center hole, and when a chucking error occurs, the distance from the optical pickup 7 varies for an area nearer the outer edge of the optical disk D. Therefore, the focusing drive voltages are measured at two points, and the difference between the two voltages is calculated, so that the angle at which the optical disk D is slanted can be easily obtained.

Since the distance from the optical pickup 7 does not change much at the center of the optical disk D, whether following chucking an optical disk D is elevated relative to the turntable 11a may be determined by measuring the focusing drive voltages.

The focusing servo should be activated in the radial direction of the optical disk D, first at a point near the outer edge of the optical disk D, and then at a point nearer the center. During the recording and reproduction of data, the lead-in and PMA, which are nearer the center of the optical disk D, are read first, and when the chucking is determined to be satisfactory, the recording and reproduction of data can be initiated immediately while the optical pickup 7 has substantially not been moved.

The optical disk apparatus 1 performs the chucking determination in the following manner. When the chucking mechanism 11 has chucked the optical disk D, the optical disk apparatus 1 moves the optical pickup 7 to a position near the edge of the program area (near the outer edge) of the optical disk D, and activates the focus servo. Then, the focusing drive voltage is measured, and this value is temporarily stored in the memory 14. Sequentially, the optical disk apparatus 1 moves the optical pickup 7 to a position in the lead-in area (nearer the center), activates the focus servo and measures the focusing drive voltage. Then, the optical disk apparatus 1 compares the focusing drive voltage measured near the outer edge of the optical disk D and the focusing drive voltage measured near the center of the optical disk D, and obtains a difference between the two voltages. This voltage difference is a value corresponding to the angle at which the optical disk D is slanted. The optical disk apparatus 1 then reads, from the memory 14, the permissible value for the voltage difference, and compares the voltage difference with this value to determine whether the angle at which the optical disk D is slanted is permissible.

Furthermore, the optical disk apparatus 1 reads from a memory (not shown) a focusing drive voltage obtained when the optical disk D is correctly positioned, and compares this value with the focusing drive voltage obtained near the outer edge of the optical disk D and the focusing drive voltage obtained near the center of the optical disk D. Based on the comparison results, whether the optical disk D is elevated relative to the turntable 11a can be determined.

Through this processing, the optical disk apparatus 1 can determine the chucked state of the optical disk D, i.e., whether the optical disk D will hit the tray 10 or other portions optical dick device 1 while rotating, or whether the optical disk D, after chucking, is elevated relative to the turntable 11a.

(2) Re-chucking

When, as the result of the determination made in the manner explained in (1), the chucking state is unsatisfactory, the optical disk apparatus 1 releases the optical disk D and chucks it again. That is, in the optical disk apparatus 1 wherein the chucking mechanism 11 interacts with the tray 10 on which the optical disk D is mounted, when the chucking state is inappropriate, the tray 10 is moved out to a position whereat the chucking of the optical disk D is released, and the re-chucking is performed.

(3) Change in a Turntable Position

For re-chucking (2), the optical disk apparatus 1 can turn the turntable 11a at a predetermined angle. That is, for re-chucking the optical disk D, there is a case wherein the turntable 11a in the current state need only be turned to change its position relative to the optical disk D, so that the optical disk D can be correctly chucked. Therefore, during the re-chucking process performed by the optical disk D, the optical disk apparatus 1 rotates and halts the turntable 11a so that the optical disk D can be correctly chucked.

(4) Determination of Warp

During the determination process explained in (1), the optical disk apparatus 1 activates the focus servo at a plurality of positions in the radial direction of the optical disk D, so that warping of the optical disk D can be detected. FIGS. 3A, 3B and 3C are front views of an optical disk D having a distorted face, and the states wherein the optical disk apparatus 1 has chucked this optical disk D. When, as is shown in FIG. 3B, the optical disk apparatus 1 accurately chucks the optical disk D in FIG. 3A which has a distorted face, the optical disk apparatus 1 cannot perform the recording and reproduction of data near the outer edge of the optical disk D.

When, as is shown in FIG. 3C, the optical disk apparatus 1 inaccurately chucks the optical disk D in FIG. 3A, the warp is reduced in appearance, and the recording and reproduction of data near the outer edge can be performed. However, under other circumstances, it is highly probable that the optical disk apparatus 1 will not be able to chuck this optical disk D in this manner and that it will not be possible to perform the recording and reproduction of data. In such a case, when a user is notified that the optical disk is warped, the user can halt the recording of data on the optical disk D.

The optical disk apparatus 1 activates the focusing servo at a plurality of positions in the radial direction of an optical disk D in order to detect the warping of the optical disk D. For example, at three positions, a position near the last edge of the program area (near the outer edge) of the optical disk D, a central position in the lead-in area (near the center) and a position between these two, the optical disk apparatus 1 activates the focusing servo, measures the focusing drive voltages and examines the optical disk D for warping. Of course, when the user sets the optical disk apparatus 1 so it activates the focusing servo at more positions, warping of the optical disk D can be detected more accurately.

According to this embodiment, a permissible value (a second reference value) for a voltage difference that corresponds to the angle at which the optical disk D is warped is stored in the memory 14. Thus, when the optical pickup 7 is moved from the outer edge of an optical disk D to the center in the radial direction, the focus servo is activated at three positions, for example, and the focusing drive voltages are measured. Thereafter, the difference is calculated between the voltages measured at two adjacent positions (e.g., the position near the outer edge and the middle position, and the middle position and the position near the center), and this difference is compared with the permissible value stored in the memory 14. When the voltage difference is smaller than the permissible value, it is determined that warping has had no affect.

When the optical disk apparatus 1 correctly chucks the optical disk D, and when warping at the outer edge of the optical disk D is equal to or greater than a permissible value, the optical disk apparatus 1 can not perform the recording and reproduction of data, leading the optical disk apparatus 1 to discharge the tray 10 without retrying to chuck the optical disk D again, and displays a message, on the display unit 22, that the optical disk D is warped.

In the processing explained in (1), when the optical disk apparatus 1 disables the activation of the focusing servo because the optical disk D is incorrectly chucked and the angle at which it is slanted is large, the optical disk apparatus 1 immediately performs the chucking again. In the processing explained in (4), when the optical disk apparatus 1 disables the focus servo because the optical disk D is badly warped, the tray 10 is discharged immediately.

Figure 4:
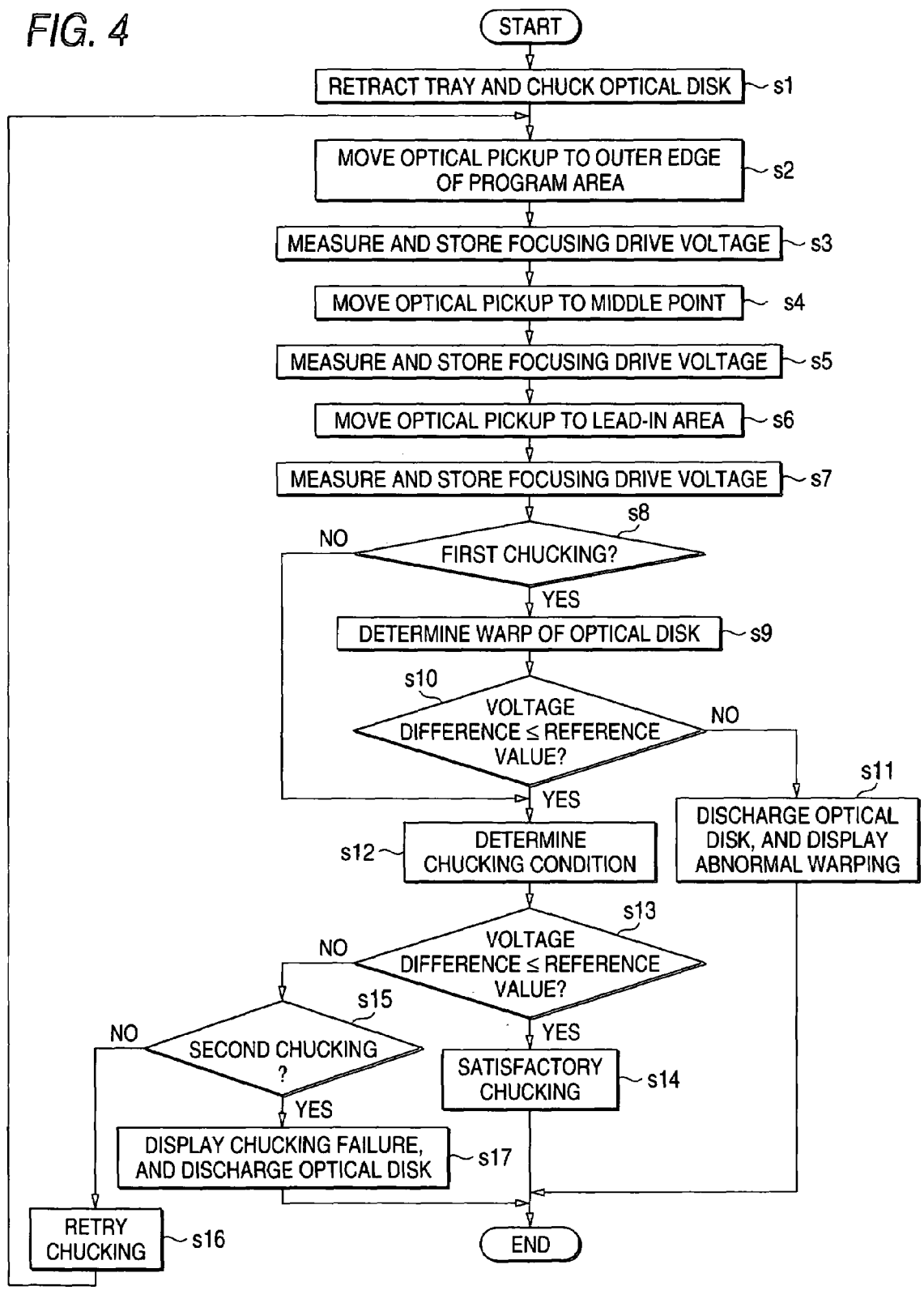
FIG. 4 is a flowchart for explaining the operation of the optical disk apparatus according to the embodiment of the invention.
Figure 5A:
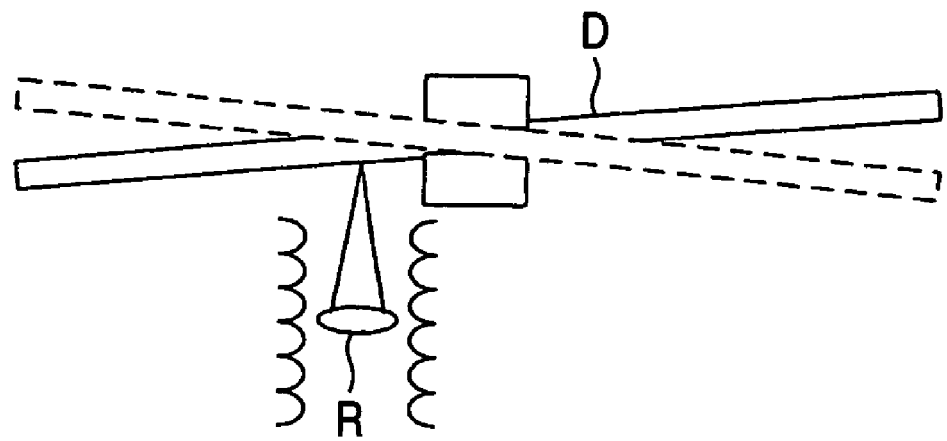
FIGS. 5A and 5B are diagrams showing the positional relationship between an optical pickup of a conventional disk apparatus and a recording face of an optical disk inappropriately chucked by the disk apparatus.
Figure 5B:
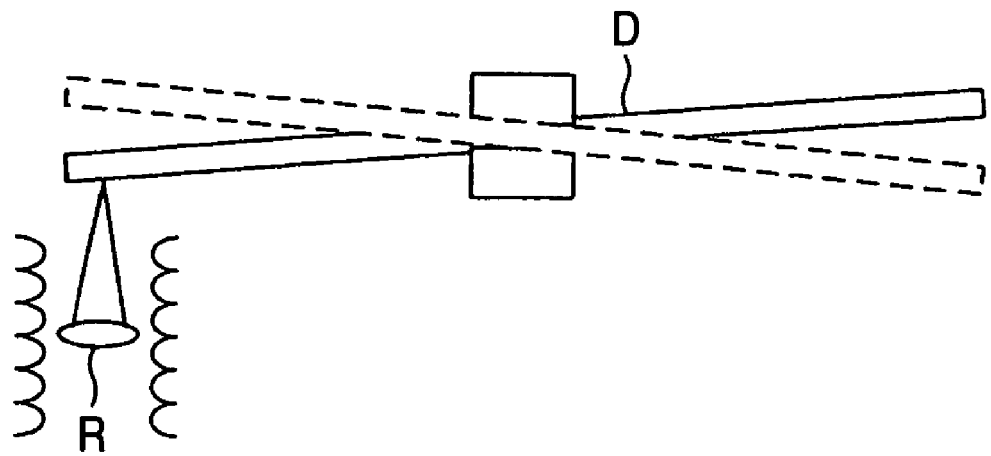

An explanation will be given for a specific operation performed by the optical disk apparatus 1 when the optical disk D is mounted on the tray 10. FIG. 4 is a flowchart for explaining the operation of the optical disk apparatus according to the embodiment of the invention.

The user places the optical disk D on the tray 10 of the optical disk apparatus 1, and manipulates the eject button 13a. Upon the detection of this operation, the tray drive motor control circuit 13 of the optical disk apparatus 1 activates the tray drive motor 12 and retracts the tray 10. In response to this operation, the chucking mechanism 11 of the optical disk apparatus 1 chucks the optical disk D on the turntable 11a (S1).

After the optical disk D is chucked, while deferring the rotation of the spindle motor 2, the control circuit 15 permits the servo circuit 8 to drive the feed motor 6 and move the optical pickup 7 to a position facing the outer edge of the program area of the optical disk D (S2). Then, at this position, the focusing servo is activated, and under the control of the control circuit 15, the laser power control circuit 9 and the servo circuit 8 permit the optical pickup 7 to emit a laser beam having a predetermined power. At this time, the control circuit 15 receives a signal, from the servo circuit 8, output in consonance with the level of the focusing drive voltage, and stores, in the memory 14, a voltage value based on the signal (S3).

Following this, the control circuit 15 permits the servo circuit 8 to drive the feed motor 6 and move the optical pickup 7 a position corresponding to the mid point of the program area on the optical disk D (S4). Then, at this position, the focusing servo is activated, and under the control of the control circuit 15, the laser power control circuit 9 and the servo circuit 8 permit the optical pickup 7 to emit a laser beam having a predetermined power. At this time, the control circuit 15 receives a signal, from the servo circuit 8, output in consonance with the level of the focusing drive voltage, and stores, in the memory 14, a voltage value based on this signal (S5).

Furthermore, the control circuit 15 permits the servo circuit 8 to drive the fed motor 6 and move the optical pickup 7 to a position facing the lead-in area of the optical disk D (S6). Thereafter, at this position, the focusing servo is activated, and under the control of the control circuit 15, the laser power control circuit 9 and the servo circuit 8 permit the optical pickup 7 to emit a laser beam having a predetermined power. At this time, the control circuit 15 receives a signal, from the servo circuit 8, output in consonance with the level of the focusing drive voltage, and stores, in the memory 14, a voltage value based on this signal (S7).

Since the current chucking is a first trial (S8), the control circuit 156 reads, from the memory 14, the focusing drive voltage values obtained at the three positions and reference values stored in advance for the focusing drive voltages, obtains the differences between these voltages and the differences between the voltages and the reference values, and determines whether the optical disk D is warped (S9).

When the optical disk D is warped, and the voltage differences are greater than the reference values (S10), the control circuit 15 permits the tray drive motor control circuit 13 to drive the tray drive motor 12 and discharge the tray 10. Furthermore, the control circuit 15 transmits a signal to the controller 25, which displays a message, on the display unit 22, that the warping of the optical disk D is equal to or greater than the permissible value (S11). The processing is thereafter terminated.

When, at step s10, the optical disk D is not warped or the voltage differences are equal to or smaller than the reference values, the control circuit 15 examines the chucking of the optical disk D. That is, the control circuit 15 calculates a difference between the focusing drive voltage obtained at the position facing the outer edge of the program area of the optical disk D and the focusing drive voltage obtained at the position facing the lead-in area of the optical disk D, reads the reference value for the focusing drive voltage difference, and compares the difference with the reference value (S12).

When the voltage difference is equal to or smaller than the reference value (S13), the control circuit 15 determines that the optical disk D is appropriately chucked (S14) and the processing is terminated.

When the difference is greater than the reference value and the chucking is the first trial (S13 and S15), the control circuit 15 determines the chucking is not satisfactory, releases the optical disk D, and retries the chucking. That is, the control circuit 15 permits the tray drive motor control circuit 13 to drive the tray drive motor 12 and discharge and retract the tray 10. In this manner, the chucking of the optical disk D is performed again (S16).

Following this, the control circuit 15 again performs the processes at steps s2 to s7. Since this chucking is the second trial (S8), the control circuit 15 examines the chucking of the optical disk D without determining whether the optical disk D is warped. That is, the control circuit 15 calculates a difference between the focusing drive voltage obtained at the position facing the outer edge of the program area on the optical disk D and the focusing drive voltage obtained at the position facing the lead-in area on the optical disk D, and reads the reference value for the focusing drive voltage and compares it with the reference value (S12).

When the difference is equal to or smaller than the reference value (S13), the control circuit 15 determines that satisfactory chucking has been performed (S14), and the process is terminated.

When the difference is greater than the reference value, and this chucking is the second trial (S13 and S15), the control circuit 15 determines that the chucking is inappropriate, and permits the tray drive motor control circuit 13 to drive the tray drive motor 12 and discharge the tray 10. Furthermore, the control circuit 15 transmits a signal to the controller 25, and the controller 25 displays a message, on the display unit 22, that the chucking performed for the second trial is still inappropriate (S17). Thereafter, the processing is terminated.

According to the aspects of the present invention, the following effects can be obtained.

(1) When an optical disk has been chucked inappropriately, the chucking state can be determined without rotating the optical disk, and scratching of the optical disk and damage to the optical disk apparatus can be prevented. Further, when the angle at which an inappropriately chucked optical disk is slanted is greater than the first reference value, the optical disk apparatus can repeat the chucking process and correct a chucking error.

(2) When the optical disk apparatus determines that the state of an optical disk that is again chucked is inappropriate, the optical disk is discharged. Therefore, the user can immediately apprehend that the optical disk was chucked incorrectly and examine the optical disk.

(3) An optical disk can be examined for warping and a user can be informed when it is determined that the optical disk is badly warped. Further, erroneous use, by the user, of the warped optical disk can be avoided.

(4) Since the optical disk apparatus performs the recording and reproduction of data beginning at the center of the optical disk, the recording and reproduction of data on the optical disk can be performed immediately after the focusing drive voltage measurements have been completed, and the chucking and the warping of the optical disk have been determined to be satisfactory.

What is claimed is:

1. An optical disk apparatus comprising:
    a tray means for carrying an optical disk in and out of the optical disk apparatus;
    a chucking means for chucking the optical disk;
    a laser irradiation means for emitting a laser beam that is focused on the optical disk, and for activating a focusing servo;
    a moving means for moving the laser irradiation means in a radial direction of the optical disk;
    a measurement means for, after the chucking means has chucked the optical disk, measuring focusing drive voltages for the focusing servo at a point near a center of the optical disk and at a point near an outer edge of the optical disk, without rotating the optical disk; and
    a control means for comparing, with a first reference value, a difference between the focusing drive voltages measured by the measurement means, and for, when the difference between the focusing drive voltages is greater than the first reference value, permitting the chucking means to release and again chuck the optical disk;
    wherein, in the case where the chucking means repeats the chucking of the optical disk, the measurement means, without rotating the optical disk, again measures the focusing drive voltages for the focusing servo at the point near the center of the optical disk and the point near the outer edge of the optical disk, and the control means compares, with the first reference value, the difference between the focusing drive voltages, and when the difference is greater than the first reference value, permits the chucking means to release the optical disk and the tray means to discharge the optical disk;
    in the case where the measurement means measures the focusing drive voltages while the laser irradiation means is moved between the point near the center of the optical disk and the point near the outer edge and the focusing servo is actuated, the control means compares, with a second reference value, a difference between the focusing drive voltages for the measurements made by the measurement means at two adjacent points, and when the difference between the focusing drive voltages is greater than the second reference value, permits the chucking means to release the optical disk and the tray means to discharge the optical disk; and
    in the both cases the measurement means measures focusing drive voltages while the moving means moves the laser irradiation means from the outer edge to the center.

2. An optical disk apparatus comprising:
    a tray means for carrying an optical disk in and out of the optical disk apparatus;
    a chucking means for chucking the optical disk;
    a laser irradiation means for emitting a laser beam that is focused on the optical disk, and for activating a focusing servo;
    a moving means for moving the laser irradiation means in a radial direction of the optical disk;

a measurement means for, after the chucking means has chucked the optical disk, measuring focusing drive voltages for the focusing servo at a point near a center of the optical disk and at a point near an outer edge of the optical disk, without rotating the optical disk; and a control means for comparing, with a first reference value, a difference between the focusing drive voltages measured by the measurement means, and for, when the difference between the focusing drive voltages is greater than the first reference value, permitting the chucking means to release and again chuck the optical disk;

wherein, in the case where the measurement means measures the focusing drive voltages while the laser irradiation means is moved between the point near the center of the optical disk and the point near the outer edge and the focusing servo is actuated, the control means compares, with a second reference value, a difference between the focusing drive voltages for the measurements made by the measurement means at two adjacent points, and when the difference between the focusing drive voltages is greater than the second reference value, permits the chucking means to release the optical disk and the tray means to discharge the optical disk.

3. The optical disk apparatus according to claim 2, wherein, in the case where the chucking means repeats the chucking of the optical disk, the measurement means, without rotating the optical disk, again measures the focusing drive voltages for the focusing servo at the point near the center of the optical disk and the point near the outer edge of the optical disk, and the control means compares, with the first reference value, the difference between the focusing drive voltages, and when the difference is greater than the first reference value, permits the chucking means to release the optical disk and the tray means to discharge the optical disk.

4. The optical disk apparatus according to claim 2, wherein the measurement means measures focusing drive voltages while the moving means moves the laser irradiation means from the outer edge to the center.

5. The optical disk apparatus according to claim 3, wherein the measurement means measures focusing drive voltages while the moving means moves the laser irradiation means from the outer edge to the center.

6. The optical disk apparatus according to claim 2, wherein the measurement means measures focusing drive voltages while the moving means moves the laser irradiation means from the outer edge to the center.

7. An optical disk apparatus comprising:

a tray for carrying an optical disk in and out of the optical disk apparatus;

a chucking unit that chucks the optical disk;

a laser irradiation unit that emits a laser beam to be focused on the optical disk, the laser irradiation unit activating a focusing servo;

a moving unit that moves the laser irradiation unit in a radial direction of the optical disk;

a measurement unit that, after the chucking unit has chucked the optical disk, measures focusing drive voltages for the focusing servo at a point near a center of the optical disk and at a point near an outer edge of the optical disk, without rotating the optical disk; and a controller that compares, with a first reference value, a difference between the focusing drive voltages measured by the measurement unit, the controller permitting the chucking unit to release and again chuck the optical disk when the difference between the focusing drive voltages is greater than the first reference value;

wherein, in the case where the measurement unit measures the focusing drive voltages while the laser irradiation unit is moved between the point near the center of the optical disk and the point near the outer edge and the focusing servo is actuated, the controller compares, with a second reference value, a difference between the focusing drive voltages for the measurements made by the measurement unit at two adjacent points, and when the difference between the focusing drive voltages is greater than the second reference value, permits the chucking unit to release the optical disk and the tray to discharge the optical disk.

8. The optical disk apparatus according to claim 7, wherein, in the case where the chucking unit repeats the chucking of the optical disk, the measurement unit, without rotating the optical disk, again measures the focusing drive voltages for the focusing servo at the point near the center of the optical disk and the point near the outer edge of the optical disk, and the controller compares, with the first reference value, the difference between the focusing drive voltages, and when the difference is greater than the first reference value, permits the chucking unit to release the optical disk and the tray to discharge the optical disk.

9. The optical disk apparatus according to claim 7, wherein the measurement unit measures focusing drive voltages while the moving unit moves the laser irradiation unit from the outer edge to the center.

10. The optical disk apparatus according to claim 8, wherein the measurement unit measures focusing drive voltages while the moving unit moves the laser irradiation unit from the outer edge to the center.

* * * * *